United States Patent [19]

Yamasaki et al.

[11] 3,828,309

[45] Aug. 6, 1974

[54] APPARATUS FOR DETECTING THE INTERNAL PRESSURE OF A TIRE

[75] Inventors: Hiroyuki Yamasaki, Kyoto; Masaaki Kaida, Tokyo, both of Japan

[73] Assignees: Omron Tateisi Electronics Co., Kyoto; Bridgestone Tire Co., Ltd., Tokyo, both of Japan

[22] Filed: Dec. 20, 1972

[21] Appl. No.: 316,908

[30] Foreign Application Priority Data
Dec. 27, 1971 Japan.................... 46-105246

[52] U.S. Cl................................ 340/58, 200/61.25
[51] Int. Cl........................................ B60c 23/02
[58] Field of Search ......... 340/58; 200/61.22, 61.25

[56] References Cited
UNITED STATES PATENTS

| | | | |
|---|---|---|---|
| 2,057,556 | 10/1936 | Cole..................................... | 340/58 |
| 2,629,086 | 2/1953 | Ainsworth et al.................... | 340/58 |

Primary Examiner—Alvin H. Waring
Attorney, Agent, or Firm—Christensen, O'Connor, Garrison & Havelka

[57] ABSTRACT

Apparatus for detecting the internal pressure of a tire, wherein a magnetic member is attached to a wheel of a vehicle for simultaneous rotation therewith and a coil is mounted on the chassis of the vehicle so that as the wheel rotates, the magnetic member passes by the coil for a voltage to be induced in the coil by electromagnetic induction. There is provided means operable in response to the tire pressure to change the position of the magnetic member relative to the coil, so that when an abnormal drop occurs in the tire pressure, the position of the magnetic member changes with a resulting change in the level or phase of the induced voltage.

12 Claims, 17 Drawing Figures

PATENTED AUG 6 1974 3,828,309

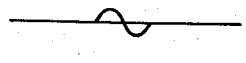
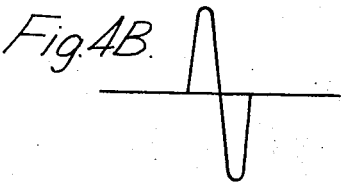
Fig.4A.   Fig.4B.
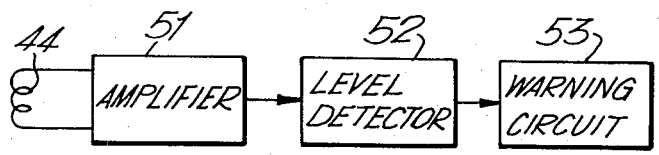
Fig. 6.
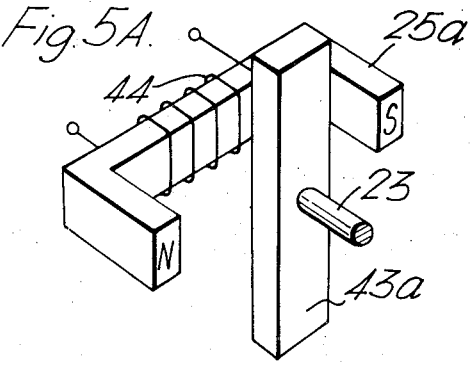
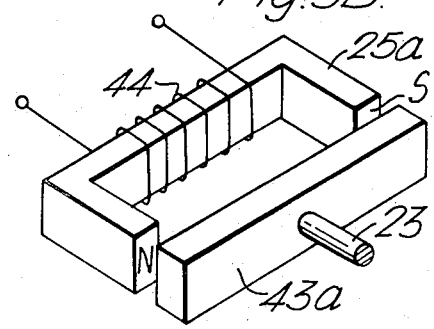
Fig.5A.   Fig.5B.
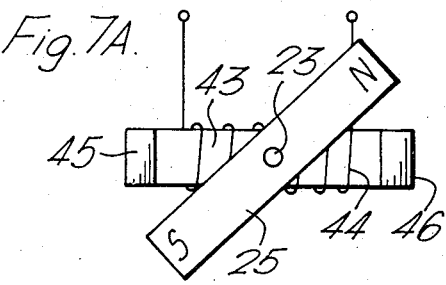
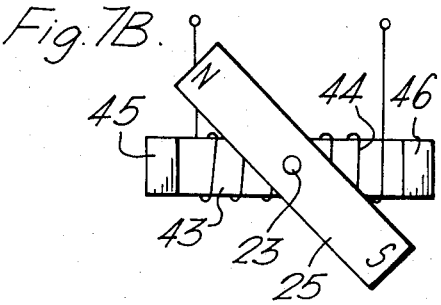
Fig.7A.   Fig.7B.
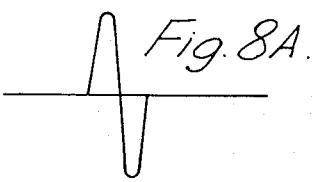
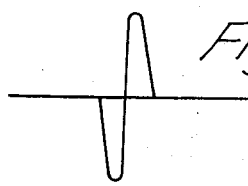
Fig.8A.   Fig.8B.
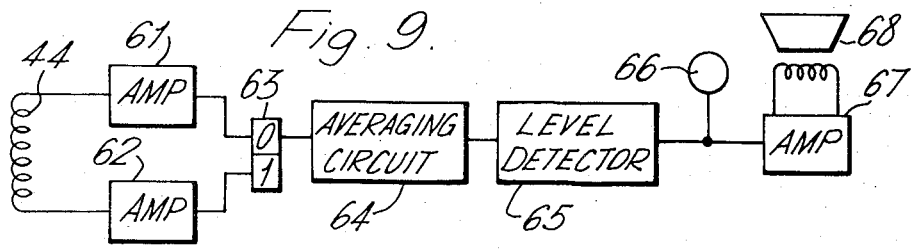
Fig.9.

APPARATUS FOR DETECTING THE INTERNAL PRESSURE OF A TIRE

This invention relates to an apparatus for checking the internal pressure in a tire and more particularly an apparatus for detecting an abnormal decrease of the tire pressure to produce an electrical signal.

Known tire pressure detectors are expensive and not very reliable in operation so that they are not widely used. One of the difficult problems the detectors have is how to transmit signals between the movable part (that is, the wheel) of a vehicle and the relatively stationary part (that is, the chassis) of the vehicle. One method is to transmit signals magnetically. To this end, a permanent magnet is attached to the wheel while a reed switch is mounted on the chassis so that the magnet is moved toward or away from the switch as the internal pressure of the tire changes. In this arrangement, when an abnormal drop in the tire pressure occurs, the gap between the reed switch and the permanent magnet changes so that the flux from the magnet closes or opens the switch, thereby detecting the abnormal tire pressure drop. However, the reed switch has contacts so that vibrations of the chassis while the vehicle is running cause corresponding vibrations in the switch so that the switch may sometimes be closed or opened erroneously even when the tire pressure remains normal. Moreover, switches having mechanical contacts are likely to fail due to fatigue of the material of the parts.

Accordingly, the primary object of the invention is to provide an apparatus which is capable of accurately detecting the internal pressure of a tire.

Another object of the invention is to provide an apparatus for detecting the tire pressure which is free from an adverse influence by vibrations of the vehicle body.

Another object of the invention is to provide an apparatus for detecting the tire pressure, which utilizes magnetic transmission of signals and does not use any mechanical contacts.

Another object of the invention is to provide an apparatus for detecting the tire pressure, which employs a magnet and a coil electromagnetically coupled with the magnet, so that transmission of signals can be effected without use of any mechanical contacts.

Another object of the invention is to provide an apparatus for detecting the tire pressure, which employs a magnet and a coil electromagnetically coupled with the magnet, so that changes in the tire pressure are detected as changes in the electromagnetic induction between the magnet and the coil.

Still another object of the invention is to provide an apparatus for detecting the tire pressure, which employs a magnet and a coil electromagnetically coupled therewith, so that changes in the tire pressure can be detected by changes in the level of the voltage induced in the coil by electromagnetic induction.

A further object of the invention is to provide an apparatus for detecting the tire pressure, which employs a magnet and a coil electromagnetically coupled therewith, so that changes in the tire pressure can be detected by changes in the phase of the voltage induced in the coil by electromagnetic induction.

Still another object of the invention is to provide an apparatus for detecting the tire pressure, which employs a tire pressure responsive signal generating device for each of the wheels of the vehicle and a common signal processing device for processing the signals from all the signal generating devices, thereby simplifying the construction of the apparatus.

In one embodiment of the invention, a permanent magnet is mounted on a vehicle wheel for simultaneous rotation therewith, and a coil is fixed to the vehicle chassis, so that upon every one revolution of the wheel the magnet periodically passes by the coil, whereupon the flux from the magnet links with the coil. Preferably, the coil is wound on an iron core. The arrangement is such that as the tire pressure changes, the position of the magnet relative to the coil changes. For example, the magnet is supported at a middle point between its opposite poles so as to be rotatable about an axis. The number of flux from the magnet that cross the coil with one rotated position of the magnet is different from the number of flux that cross the coil with a different rotated position thereof, with a resulting difference in the level of the voltage induced in the coil. Thus, by measuring the induced voltage level it is possible to detect changes in the internal air pressure of the tire.

If the arrangement is such that the magnet is rotated 180° when an abnormal drop in the tire pressure occurs, the position of the opposite poles of the magnet is reversed, so that the phase of the voltage induced in the coil is reversed. Therefore, by detecting the induced voltage phase it is possible to know occurrence of an abnormal drop in the tire pressure.

In another embodiment of the invention, a magnet is mounted on the vehicle body and a coil is wound on the magnet. The magnet can be a permanent magnet or an electromagnet. A piece of iron is mounted on the vehicle wheel for rotation therewith. The piece of iron is rotatably supported at the middle point of its length by a shaft. The piece of iron operates in substantially the same manner as the rotatably supported magnet in the above mentioned first embodiment of the invention.

In still another embodiment of the invention, a pair of magnets are mounted on the vehicle wheel so that as the tire pressure changes, the positions of the magnets change without changing the relative positions of the magnets to each other. A coil is mounted on a relatively stationary part of the vehicle body, so that as the wheel rotates with a normal tire pressure, one of the magnet comes near the coil so that the flux from the one magnet links with the coil for a electromagnetic induction of a voltage in the coil. When an abnormal drop in the tire pressure occurs, the positions of the magnets relative to the coil are changed so that the other magnet instead of the one magnet comes near the coil. The polarity of the other magnet is opposite to that of the one magnet, so that the phase of the voltage induced by the other magnet is opposite to that of the voltage induced by the one magnet. Thus, by detecting the phase of the induced voltage it is possible to detect an abnormal drop in the tire pressure.

In this case, if a single magnet instead of the two is provided at the position of one of the magnets, the magnet is positioned near or away from the coil as the tire pressure changes, so that by measuring the magnitude of the induced voltage it is possible to detect changes in the tire pressure.

The invention will be described in further detail with reference to the accompanying drawings, wherein:

FIGS. 4A and 4B show the waveforms of the voltages induced in the coil shown in FIGS. 3A and 3B;

FIGS. 5A and 5B are perspective views similar to FIGS. 3A and 3B but showing the coil wound on a magnet attached to the vehicle chassis and a rotatable piece of iron mounted on the wheel;

FIG. 6 is a block diagram of a circuit receiving the voltage induced in the coil to operate a warning device;

FIGS. 7A and 7B are front views similar to FIGS. 3A and 3B but showing a different embodiment;

FIGS. 8A and 8B show waveforms of the voltages induced in the coil in FIGS. 7A and 7B;

FIG. 9 is a block diagram of a circuit receiving the induced voltages shown in FIGS. 8A and 8B to operate a warning device;

Figure 1:
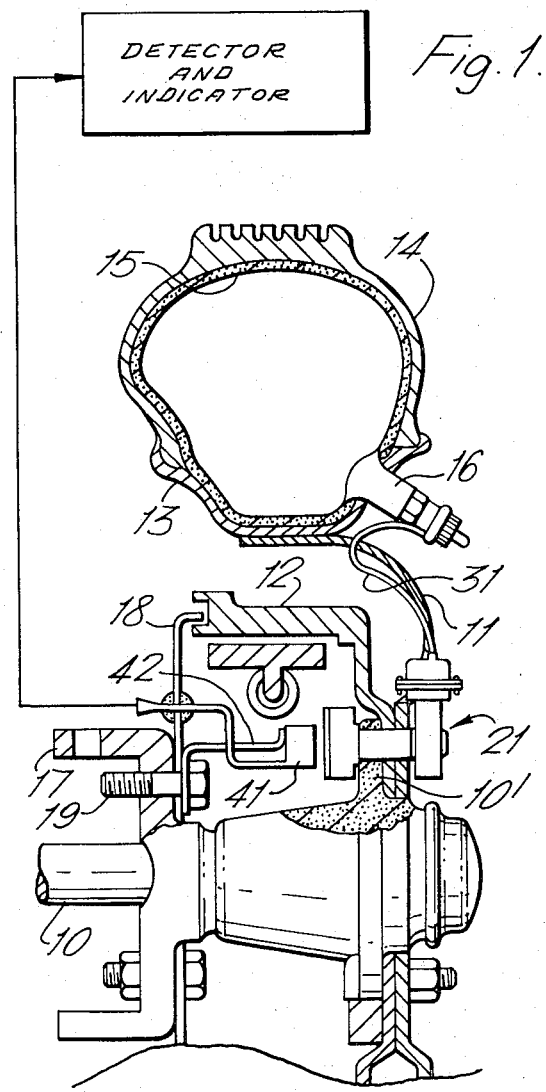
FIG. 1 shows one embodiment of the invention as mounted on an automobile tire shown in vertical section.

Referring to the drawings, there is shown in FIG. 1 a typical structure of an automobile wheel. An axle 10 has a disk 10' to which a flange 11 and a brake drum 12 are secured by means of a bolt and nut connection. A rim 13 is fixed to the flange 11 and a tire 14 is fixed to the rim 13. A tube 15 is enclosed in the tire. The tire may be of a tubeless type. A valve stem 16 piercing through the rim 13 is connected to the tube 15 and through the valve stem pressurized air is supplied into the tube to inflate it to a desired internal pressure.

A stator 17 comprises a part of the chassis which remains stationary relative to the rotating wheel. A flange 18 is secured to the stator 17 by means of bolts 19 so as to close the brake drum 12.

A pressure responsive unit generally designated at 21 is mounted on the wheel. As shown in detail in FIG. 2, the unit 21 comprises a bearing sleeve 22 piercing through the flange 11, the brake drum 12 and the disk 10' and secured thereto. A shaft 23 passing through the bearing sleeve 22 is provided at its outer end with a pinion gear 24 and at its inner end with a permanent magnet 25. A casing 26 threaded to the bearing sleeve 22 and closed by a lid 27 encloses the magnet 25. The casing 26 and the lid 27 are made of a suitable non-magnetic material such as plastic resin. The magnet 25 takes the form of a rod with N and S poles at the opposite ends thereof and is connected at its middle point to the shaft 23.

A pressure chamber 30 is secured to the flange 11 of the wheel and communicates with the inside of the tube 15 through a pipe 31 connected to the valve stem 16. The bottom of the pressure chamber 30 comprises a diaphragm 32 which closes and seals the chamber against the atmosphere. The inside pressure of the chamber 30 corresponds to that of the tire. A rack 33 has its upper end fixed to the underside of the diaphragm 32 and meshes with the pinion gear 24. Due to the internal pressure of the tire acting on the inner surface of the diaphragm, its outer surface projects convexly thereby moving the rack gear 33 downwardly as viewed in FIG. 2. The movement of the rack gear 33 causes rotation of the pinion 24 and consequently the magnet 25. The arrangement must be such that the rotation of the pinion 24 and the magnet 25 be less than one revolution and preferably about 90° to 180° (one-fourth to one-second of a revolution). It is so designed that when the internal pressure of the tire has changed from the normal pressure to an abnormally decreased pressure, the diaphragm 32 is so deformed as to effect a desired degree of revolution of the pinion and the magnet.

A coil unit 41 is mounted on the stator 17 by means of a support 42. The unit 41 comprises an iron core 43 having a pair of legs 45 and 46 and a coil 44 wound on the core 43. The unit 41 is so disposed that the plane including the end faces of the core legs 45 and 46 is parallel with the plane in which the magnet 25 is rotated. The distance between the two core legs 45 and 46 is such that they are magnetically connected by the magnet 25 to form a closed magnetic circuit.

The magnet 25 is rotated about the axle 10 of the wheel when the wheel is rotated, and at the same time the magnet is rotatable about its own shaft 23. However, if the distance between the core legs 45 and 46 is sufficiently shorter than the distance between the magnet 25 and the wheel axle 10, the magnet 25 may be considered as being moved in parallel relative to the core legs 45 and 46 when the magnet 25 is rotated about the wheel axle 10.

Figure 3A:
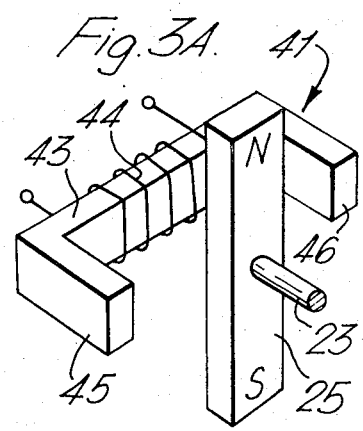
FIGS. 3A and 3B are perspective enlarged view showing different relative positions of the magnet and the coil.

Suppose that with the normal pressure of the tire, the magnet 25 is positioned perpendicularly to the straight line connecting the core legs 45 and 46 as shown in FIG. 3A. As the magnet 25 is rotated about the wheel axle 10, the coil 44 cuts only a small number of the magnetic flux produced by the magnet 25, and the manner in which the coil 44 crosses the flux when the magnet is near one of the core legs is opposite to the manner in which the coil 44 crosses the flux when the magnet is near the other core leg. Therefore, the voltage induced in the coil while the wheel (and the magnet 25 thereon) makes one revolution about its axle 10 is of a relatively small cycle as shown in FIG. 4A. However, when the pressure of the tire has so decreased that the magnet 25 is rotated 90° counterclockwise from the position of FIG. 3A to that in FIG. 3B in which the magnet 25 lies in parallel with the straight line connecting the core legs 45 and 46, a far larger number of the flux from the magnet 25 will be crossed by the coil than in FIG. 3A as the wheel (the magnet 25) is rotated about the axle 10, so that a greater voltage will be induced in the coil as shown in FIG. 4B. Thus, by measuring the induced voltage it is possible to know the condition of the internal pressure of the tire. In practice the arrangement may be such that if the induced voltage exceeds a predetermined level, the condition is considered to indicate that an abnormal decrease of the tire pressure has occurred.

In the embodiment, the magnet is mounted on the wheel. The magnet 25 and the iron core 41 in FIGS. 2 or 3A and 3B may be replaced by a piece of iron 43a and a permanent magnet 25a, respectively, and a coil 44 is wound about the magnet 25a, as shown in FIG. 5A or 5B. Since the magnet 25a is stationary, it need not be a permanent magnet but an electromagnet if another coil energized by a suitable source of electricity is provided. The voltages induced in the coil 44 in FIGS. 5A and 5B are the same as in FIGS. 4A and 4B.

FIG. 6 shows an example of a circuit to be connected to the coil 44. The voltage induced in the coil 44 is amplified by an amplifier 51, the output of which is applied to a level detector 52. When the voltage exceeds a predetermined level set in the detector 52, the detector produces an output to actuate a warning circuit 53 to light a lamp and/or sound a buzzer.

Figure 3B:
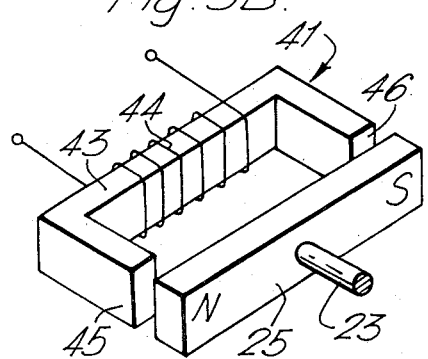

In the above arrangement that the level of the voltage induced in the coil is relied on for detection of an abnormal decrease of the internal pressure of the tire, if the gap between the core and the magnet changes, the magnetic reluctance changes with a resulting change in the induced voltage. This is particularly true with the wheels and chassis of an automobile which receive various vibrations from the surface of the road on which the automobile is running. To solve the problem, the arrangement may also be such that when the magnet is rotated due to a change in the internal pressure of the tire, the phase of the induced voltage is reversed, so that an abnormal decrease in the tire pressure can be detected by detecting such reversal of the induced voltage phase. Suppose, for example, that the tire pressure is normal with the magnet and the core being positioned relative to each other as shown in FIG. 3B. If a decrease of the tire pressure causes the magnet 25 to rotate 180°, the induced voltage is of one cycle but obviously the phase is reversed. Therefore, it is possible to detect the abnormal decrease of the tire pressure by the reversal of the phase of the induced voltage.

It is possible to reverse the induced voltage when the magnet 25 has been turned through 90°. To this end, the magnet 25 attached to the wheel is inclined relative to the core mounted on the chassis as shown in FIG. 7A, when the internal pressure of the tire is normal. In other words, if the magnet 25 is turned 45° clockwise from the position in FIG. 3A, the position in FIG. 7A results. When an abnormal decrease of the tire pressure occurs, the magnet 25 is rotated 90° counterclockwise into the position shown in FIG. 7B.

With reference to FIGS. 7A and 7B in comparison, suppose that as the magnet 25 is rotated about the wheel axle, the magnet is moved from left to right substantially linearly. One cycle of voltage is induced in the coil wound on the core 43 as shown in FIG. 8A as the wheel makes one revolution with the position of the magnet as shown in FIG. 7A. That is, first a positive half cycle is induced, which is followed by a negative half cycle. With the position of the magnet 25 as shown in FIG. 7B, one revolution of the wheel causes first a negative and then a positive half cycle to be induced in the coil 44. The phases of the two waves in FIGS. 8A and 8B are opposite. Thus, by detecting whether a negative or positive voltage is first induced it is possible to know an abnormal decrease of the internal pressure of the tire.

FIG. 9 shows by way of example an arrangement for detecting the phase of the induced voltage. The positive and negative voltages induced in the coil 44 are separately applied to two amplifires 61 and 62, respectively. The amplified positive voltage is applied as a set input to a flip-flop 63, to which the amplified negative voltage is applied as a reset input. The set output of the flip-flop 63 is applied to an averaging cicuit 64, the output of which is applied to a level detector 65. When the input to the level detector exceeds a predetermined level, it produces an output to energize a lamp 66 on the one hand and a speaker 68 through an amplifier 67 on the other hand.

When the coil 44 produces a voltage having the waveform as shown in FIG. 8A, the initial positive half wave sets the flip-flop 63 through the amplifier 61. However, the succeeding negative half wave resets the flip-flop 63 through the other amplifier 62, so that the flip-flop 63 produces an output for a very short time during one revolution of the magnet 25 about the wheel axle. On the contrary, when the coil 44 produces a voltage having the waveform of FIG. 8B, the first negative half wave resets the flip-flop 63, so that is produces no output. However, the succeeding positive half wave sets the flip-flop 63 to produce an output, which continues until the magnet 25 again approaches the coil 44 upon the next one revolution of the wheel. In other words, the flip-flop 63 produces an output most of the time of one revolution of the wheel (or the magnet 25 about the wheel axle). This means that the output value of the averaging circuit 64 is far greater in the latter case than in the former case. The greater output exceeds a level preset in the detector 65, whereupon the lam 66 is turned on and/or the speaker sounds, indicating occurrence of an abnormal decrease of the tire pressure.

Figure 10:
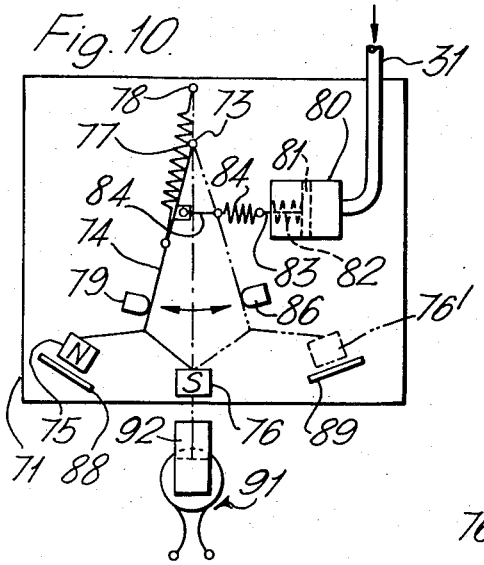
FIG. 10 is a schematic view of another embodiment of the invention.

As will be easily understood from the above description, the apparatus of the invention detects changes in electromagnetic induction caused by the magnetic coupling between a core and a magnet. The same object can be achieved by other arrangements than those illustrated and described above. FIG. 10 shows an example of such other arrangements. A pressure responsive unit 71 is attached to a wheel of an automobile and a coil unit 91, to the chassis thereof. The unit 71 includes a swingable member 74 pivoted at one end by a fixed pin 73. The other end of the member 74 is bifurcated into two fingers which support magnets 75 and 76, respectively. If the magnet 75 has an N pole on the obverse side of the drawing sheet and an S pole on the reverse side thereof in FIG. 10, the other magnet 76 has an S pole on the obverse side of the drawing sheets and an N pole on the reverse side thereof. The stationary coil unit 91 includes a core 92 so disposed that its opposite ends may be magnetically connected by either of the magnets 75 and 76.

A coil spring 77 has its one end secured to the middle point of the swingable member 74 and the other end fixed to a pin 78 disposed on a straight line connecting the pin 73 and the magnet 76. So long as the internal pressure of the tire is normal, the spring 77 biases the swingable member 74 to the position shown by a real line in FIG. 10. A stop 79 prevents farther swinging of the member 74 toward the left beyond the position.

Figure 2:
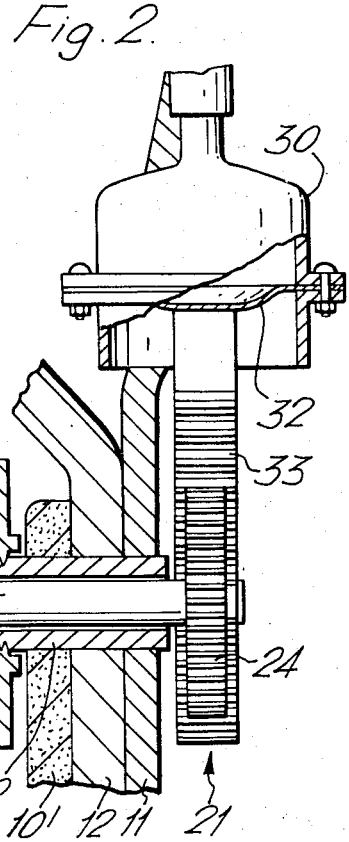
FIG. 2 is an enlarged view, partly in cross section, of the mechanism shown in FIG. 1 for rotating the magnet in response to changes in the tire pressure.

The pressure responsive unit 71 includes a cylinder 80, the chamber of which communicates with the tube of a tire not shown via a pipe 31 in the same manner as shown in FIG. 2, so that the internal pressure of the tire acts on a piston 81 disposed in the cylinder 80. A spring 82 acts on the piston against the tire pressure. A piston rod 83 connects the piston 81 to one end of a rod 85 through a spring 84 outside the cylinder. The other end of the rod 85 is connected to the swingable member 74.

When the tire pressure decreases, the resiliency of the spring 82 tends to cause the piston 81 to move rightward in FIG. 10. When the pressure in the tire has dropped to an abnormally low level, the resiliency of the spring 82 overcomes the force of a spring 77 thereby causing the member 74 to swing counterclockwise about the pin 73 through the rod 83, the spring 84 and the rod 85. When the member 74 passes the dead point at the middle of the swinging movement, the force of the spring 77 now acts to accelerate the movement of the member 74 until it hits on the stop 86 as shown in dashed lines.

When the tire pressure is increased by a supply of air into the tube, the piston 81 is moved leftward, so that the swingable member 74 is stopped by the opposite stop 79.

As the pressure responsive unit 71 rotates about the wheel axle, the unit 71 passes by the coil unit 91. If the member 74 is in the real line position in FIG. 10 (when the tire pressure is normal), it is the magnet 76 that faces the core 92 of the coil unit 91 as shown in FIG. 11A. Under the condition, the other magnet 75 may cact on the core 92. To prevent the flux from the magnet 75 from linking with the core 92, a magnetic shield plate 88 may advantageously be provided on the unit 71.

Figure 11B:
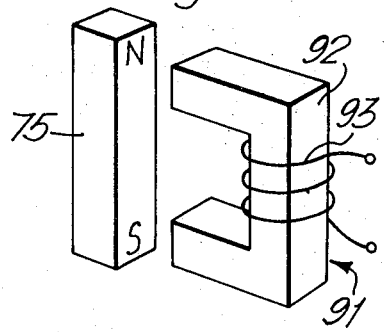
FIGS. 11A and 11B are perspective views of the two magnets and the single coil used in FIG. 10.
Figure 11A:
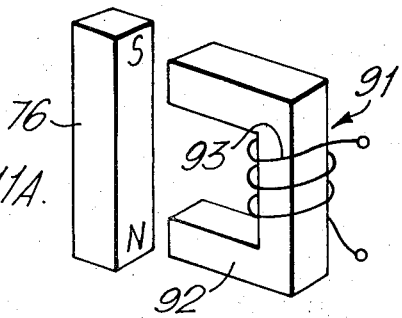

When due to an abnormal drop of the tire pressure the swingable member 74 has been shifted to the dashed line position, as the unit 71 is rotated about the wheel axle, it is the magnet 75 that faces the core 92 of the coil unit 91 as shown in FIG. 11B. When the magnet 76 is at the dashed line position 76', the magnet 76 may act on the coil unit 91. To prevent the flux from the magnet 76 from linking with the coil a magnetic shield plate 89 may advantageously be provided.

As can be easily seen, the direction of the flux passing through the core 92 in FIG. 11A is opposite to that in FIG. 11B. In both cases, one cycle of voltage is induced in the coil 93 as the wheel makes one revolution. However, the phase of the induced voltage in FIG. 11A is opposite to that in FIG. 11B, just as in FIGS. 8A and 8B. Therefore by detecting the phase of the voltage induced in the coil 93 by means of the circuit of FIG. 9 it is possible to know occurrence of an abnormal drop in the tire pressure.

If one of the magnets 75 and 76 is eliminated in FIG. 10, the level of the voltage induced in the coil 93 when the swingable member 74 is at the real line position is different from when the member 74 is at the dashed line position. In this case the level of the induced voltage may be checked for detection of an abnormal pressure drop in the tire.

Figure 12:
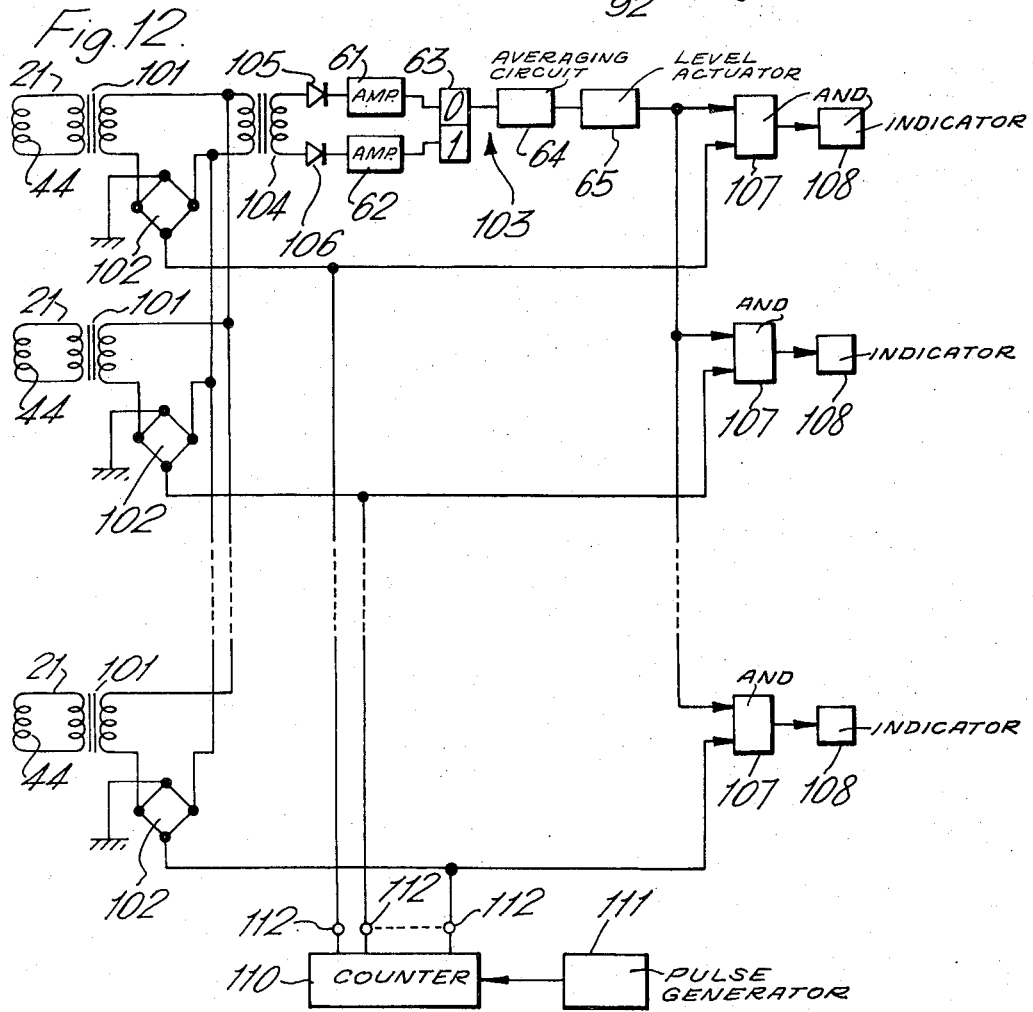
FIG. 12 is an electrical circuit diagram of still another embodiment of the invention.

A typical automobile has four wheels. However, trucks and like large-sized vehicles have more than four wheels, for each of which there must be provided a pressure detecting device, together with a signal processing circuit as shown in FIG. 6 or 9 and a warning device. In accordance with the invention, a common signal processing circuit will suffice for a plurality of pressure detecting devices on different wheels, as shown by way of example in FIG. 12.

The coil 44 of the coil unit 21 included in each pressure detecting device provided on each tire is connected to a transformer 101, to which a diode switch 102 is connected. A common signal processing circuit 103 includes a transformer 104, to which are connected the transformers 101 and the diode switches 102 belonging to all the wheels. The circuit 103 comprises amplifiers 61 and 62, a flip-flop 63, an averaging circuit 64 and a level detector 65 as in FIG. 9.

The positive or negative pulse-like signal transferred to the transformer 104 is applied to the circuit 103 through a pair of diodes 105 and 106 which prevent reverse flow of the current therethrough. As previously described with reference to FIG. 9, the level detector 65 produces an output when an abnormal drop has occurred in the tire pressure. This output is applied as one input to AND elements 107 which are provided one for each tire. The output of each AND element 107 is applied to a corresponding warning device 108 provided for each wheel.

A ring counter 110 counts pulses from a pulse generator 111. The counter 110 is provided with the same mnumber of output terminals as then number of the tire pressure detectors provided, so that as the counter 110 counts the pulses from the generator 111, an output appears successively at the output terminals to be applied to the diode switches 102 to turn on the same on the one hand and to the AND elements 107 on the other. In other words, when the first output from the counter 110 has been applied to the diode switch 102 of the pressure detector for the first tire, this first output is also applied to the AND element 107 belonging to the first detector. This means that the output from the counter 110 successively scans the tire pressure detectors for all the tires.

Suppose now that the counter 110 has produced an output at the first output terminal thereof. The diode switch 102 of the first tire pressure detector is turned on, so that the pressure responsive unit for the first tire produces a signal to be applied to the signal processing circuit 103, the output of which is connected to the AND element 107. However, so long as the tire pressure remains normal, no output is produced by the circuit 103, so that the AND element 107 will produce no output even when the first output from the counter 110 is applied to the AND element. On the contrary, if the internal pressure of the first tire drops to an abnormally low level, the circuit 103 produces an output to be applied as one input to the AND element 107, to which the first output from the counter 110 is applied as the other input, so that the AND element produces an output to actuate the warning device 108 for the first tire.

In a similar manner, the second output from the counter 110 is applied to the diode switch of the tire pressure detector for the second tire, whereupon the pressure responsive unit for the second tire is connected to the circuit 103. The second output is also applied to the second AND element. Whether or not the AND element produces an output depends in the above-mentioned manner upon whether the tire pressure is normal or not. In a similar manner, as the counter produces succeeding outputs the pressure detectors for the other tires are scanned for detection of any abnormal decrease in the internal pressure thereof. The circuit of FIG. 6 may also be used as the circuit 103. Thus, one common signal processing circuit suffices for a plurality of tire pressure detectors.

What we claim is:

1. An apparatus for determining change in the internal pressure of a vehicle wheel tire, comprising: electromagnetic means for generating an electric current comprising a stationary member mounted on a vehicle chassis, and a moving member mounted on the vehicle wheel and rotatable therewith, said moving member being disposed relative to the tire at a first tire pressure such that the rotation of the tire brings said moving member periodically into a spaced relationship with said stationary member sufficient to induce a voltage of a given phase into said stationary member;

means for changing the angular position of said moving member relative to the wheel in response to a change in the internal pressure of the tire such that the spaced relationship between said moving member and said stationary member brought about by the rotation of the tire at a second tire pressure results in an induced voltage in said stationary member of opposite phase to said given phase; and means for detecting a change in the phase of the voltage induced in said stationary member.

2. An apparatus in accordance with claim 1, wherein said moving member is a permanent magnet, and said stationary member is a coil wound on a coil member of magnetic material.

3. An apparatus in accordance with claim 2, wherein said angular position changing means includes means for rotating said moving member about a fixes axis positioned at substantially the axial midpoint of said moving member.

4. An apparatus in accordance with claim 3, wherein said coil member is substantially U-shaped, having two ends, and wherein said moving member is rotated in a plane coincident with the plane defined by said two ends of said coil member.

5. An apparatus in accordance with claim 4, wherein said position changing means includes a meshed rack gear and pinion gear, said rack gear being movable in response to changes in the internal pressure of said tire, said pinion gear being connected to said movable member, any movement of said rack gear changing the angular position of said pinion gear and said movable member correspondingly.

6. An apparatus in accordance with claim 5, wherein said movable member is at a first angular position of substantially 45° with respect to a line connecting said two ends of said coil member at said first tire pressure, said movable member being rotated substantially 90° from said first position in response to a change of internal tire pressure to said second tire pressure.

7. An apparatus in accordance with claim 6, wherein said detecting means includes a flip-flop which is set by one phase of voltage induced in said stationary member and reset by the other phase of induced voltage.

8. An apparatus in accordance with claim 1, wherein said moving member comprises a pair of permanent magnets spaced apart from each other, one of said permanent magnets being in a position of periodic electromagnetic coupling with said stationary member at said first tire pressure, the other permanent magnet being at a second position spaced away from said first position and not electromagnetically coupled with said stationary member, and wherein said position changing means operates in response to a change in tire pressure to said second tire pressure to move said pair of spaced permanent magnets such that said other permanent magnet is in said first position, the polarities of said pair of permanent magnets being so selected that the direction of the electromotive force induced in said stationary means by said one magnet is opposite in phase to the electromotive force induced in said stationary member by said other magnet.

9. An apparatus in accordance with claim 8, wherein said position changing means includes a spring capable of snap action, which spring maintains said one magnet electromagnetically coupled with said stationary member at said first tire pressure, and brings said other magnet into electromagnetic coupling with said stationary member at said second tire pressure.

10. An apparatus according to claim 9, including a movable member and a stationary member for each wheel of the vehicle, and further including scanning means for successively applying the voltage induced into said stationary members to said detecting means.

11. An apparatus in accordance with claim 10, including means associated with each tire and responsive to said detecting means for indicating a change in the internal pressure of a tire, and wherein said scanning means scans said indicating means in synchronism with the applying of induced voltages in said stationary members to said detecting means such that the output of said detecting means is applied successively to the indicating means corresponding to the tire associated with that stationary member which is immediately connected to said detecting means.

12. An apparatus in accordance with claim 11, wherein said scanning means includes a plurality of AND gates, one of said AND gates being associated with each of said indicating means, and having its output applied thereto, said scanning means and said detecting means being connected as inputs to each of said AND gates.

* * * * *

FO-1050
(5/69)

UNITED STATES PATENT OFFICE
CERTIFICATE OF CORRECTION

Patent No. 3,828,309   Dated   August 6, 1974

Inventor(s)  Hiroyuki Yamasaki and Masaki Kaida

It is certified that error appears in the above-identified patent and that said Letters Patent are hereby corrected as shown below:

Column 9, line 25, before the word "axis" delete the word "fixes" and insert therefor the word --fixed--.

Signed and sealed this 22nd day of October 1974.

(SEAL)
Attest:

McCOY M. GIBSON JR.
Attesting Officer

C. MARSHALL DANN
Commissioner of Patents